(12) United States Patent
Bi et al.

(10) Patent No.: US 9,119,191 B2
(45) Date of Patent: Aug. 25, 2015

(54) METHOD AND DEVICE FOR FEEDING BACK ACKNOWLEDGMENT INFORMATION DURING SWITCHING OF BACKHAUL LINK SUBFRAME CONFIGURATION

(75) Inventors: Feng Bi, Shenzhen (CN); Jin Yang, Shenzhen (CN); Feng Liang, Shenzhen (CN); Ming Yuan, Shenzhen (CN); Shuanshuan Wu, Shenzhen (CN); Yifei Yuan, Shenzhen (CN); Wei Gou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 175 days.

(21) Appl. No.: 13/989,136

(22) PCT Filed: Nov. 8, 2011

(86) PCT No.: PCT/CN2011/081943
§ 371 (c)(1),
(2), (4) Date: May 23, 2013

(87) PCT Pub. No.: WO2012/068953
PCT Pub. Date: May 31, 2012

(65) Prior Publication Data
US 2013/0242931 A1  Sep. 19, 2013

(30) Foreign Application Priority Data

Nov. 23, 2010  (CN) .......................... 2010 1 0556044

(51) Int. Cl.
*H04W 72/04* (2009.01)
*H04L 1/18* (2006.01)

(52) U.S. Cl.
CPC ......... *H04W 72/0406* (2013.01); *H04L 1/1854* (2013.01); *H04L 1/1861* (2013.01)

(58) Field of Classification Search
CPC  H04W 72/0406; H04L 1/1854; H04L 1/1861
See application file for complete search history.

(56) References Cited

U.S. PATENT DOCUMENTS 7,835,272 B1 *  11/2010  Johnson et al. ............... 370/228
8,804,601 B2 *  8/2014  Horiuchi et al. .............. 370/315
(Continued)

FOREIGN PATENT DOCUMENTS

CN  101827448 A  9/2010
CN  101882982 A  11/2010
(Continued)

OTHER PUBLICATIONS

English abstract of CN101827448A, Sep. 8, 2010.
English abstract of CN101888661A, Nov. 17, 2010.
English abstract of CN101882982A, Nov. 10, 2010.

*Primary Examiner* — Brian D Nguyen
(74) *Attorney, Agent, or Firm* — Porter Wright Morris & Arthur LLP

(57) ABSTRACT

The disclosure provides a method and a device for feeding back Acknowledgment (ACK) information during switching of backhaul link subframe configuration, and the method includes during the switching of the backhaul link subframe configuration, if Uplink (UL) ACK/Negative ACK (NACK) information, which corresponds to a last transmission before the switching of one or more Downlink (DL) Hybrid Automatic Repeat Request (HARQ) transmissions, is not fed back on a UL subframe which is before the switching, feeding back the ACK/NACK information on an available UL subframe which is after the switching since Nms after the last transmission, wherein N is an integer. The disclosure achieves the effect of correctly feeding back the ACK information during switching of the backhaul link subframe configuration.

30 Claims, 10 Drawing Sheets

(56) References Cited

U.S. PATENT DOCUMENTS

| | | | |
|---|---|---|---|
| 2006/0083186 A1* | 4/2006 | Handforth et al. | 370/310 |
| 2010/0232285 A1* | 9/2010 | Lee et al. | 370/210 |
| 2010/0275083 A1* | 10/2010 | Nam et al. | 714/748 |
| 2010/0322177 A1* | 12/2010 | Luo et al. | 370/329 |
| 2011/0075684 A1* | 3/2011 | Zeng et al. | 370/475 |
| 2011/0103292 A1* | 5/2011 | Pasad et al. | 370/315 |
| 2011/0170496 A1* | 7/2011 | Fong et al. | 370/329 |

FOREIGN PATENT DOCUMENTS

| | | |
|---|---|---|
| CN | 101888661 A | 11/2010 |
| WO | 2010026287 | 3/2010 |
| WO | 2010064805 A2 | 6/2010 |

\* cited by examiner

METHOD AND DEVICE FOR FEEDING BACK ACKNOWLEDGMENT INFORMATION DURING SWITCHING OF BACKHAUL LINK SUBFRAME CONFIGURATION

TECHNICAL FIELD

The disclosure relates to the communication field, in particular to a method and a device for feeding back Acknowledgment (ACK) information during switching of backhaul link subframe configuration.

BACKGROUND

FIG. 1 shows a system structure diagram according to the related technologies. The Long Term Evolution Advanced (LTE-A) system adds new links after introducing Relay Nodes (RNs), and the corresponding terminologies include that: a link between an eNode-B (eNB), which is also known as Node B or base station, and the RN is named as a backhaul link, a link between the RN and User Equipment (UE) is named as an access link, and a link between the eNB and the UE is named as a direct link. An inband-relay refers to the links, which are from the eNB to a relay and is from the relay to the UE are operated on the same frequency resource. As an inband-relay transmitter may cause interference to the own receiver (self-interference), it is impossible for the link from the eNB to the relay and the link from the relay to the UE to be synchronously on the same frequency resource, only if there is enough signal separation and antenna isolation. Similarly, the relay cannot transmit data to the eNB while receiving the data transmitted from the UE. A possible method of solving the receiving and transmitting interference is that the relay does not implement transmission operation for the UE while receiving the data from the eNB, namely, a "gap" needs to be added after being relayed to the link of UE, thus being used for a backhaul subframe by configuring a Multicast Broadcast Single Frequency Network (MBSFN) subframe, so that the UE does not implement any receiving/transmitting operation within the time range of "gap", but, the relay completes the switching from transmitting to receiving within the time range of "gap", a subsequent Orthogonal Frequency Division Multiplexing (OFDM) symbol receives the data from the eNB after completing the switching. In the related art, a specific way of adopting the MBSFN subframe to be used for the backhaul subframe in the Long Term Evolution (LTE) system is that a Multimedia Broadcast Multicast Service (MBMS) Control Entity (MCE) firstly configures one or more available MBSFN subframes for the eNB, and then the eNB configures the available backhaul subframe in the available MBSFN subframes.

FIG. 2 shows a diagram of a frame structure in the related technologies; according to the requirements in the current LTE system, a 10 ms radio frame consists of 10 1 ms subframes, and may include Unicast and Multicast. In the above, when adopting a Frequency Division Duplex (FDD) mode, the #0 and #5 subframes are used for transmitting synchronization signals, and the #4 and #9 subframes are used for paging; when adopting a Time Division Duplex (TDD) mode, the #0 and #5 subframes are used for transmitting the synchronization signals, and the #1 and #6 subframes are used for paging, namely, as the FDD (#0, #4, #5, #9) subframes and is the TDD (#0, #1, #5, #6) subframes have the above special purposes, they cannot be used for distributing the MBSFN subframes, namely, the MBSFN subframes capable of being distributed in one radio frame are at most 6 subframes.

In the LTE system, the transmission of the data between the UE and the eNB needs to establish a Hybrid Automatic Repeat Request (HARQ) progress and implement corresponding feedback. When the UE receives the data of the eNB, the UE generates Uplink (UL) feedback information (for example, UL ACK/Negative ACK (NACK)) according to the decoding condition, and transmits the information to the eNB. And then, the eNB implements the next treatment according to the received information, if receiving that the ACK is equal to 1 or 0 (respectively representing that the ACK is valid when it is "1" or "0"), new data can be transmitted; if receiving that the NACK is equal to 0 or 1 (respectively representing that the NACK is valid when it is "0" or "1"), the data which needs to be retransmitted is retransmitted to the UE.

As the backhaul link cannot use the FDD (#0, #4, #5, #9) Downlink (DL) subframes, it correspondingly cannot use the FDD (#4, #8, #9, #3) UL subframes. The current design for the UL HARQ mainly includes the combination of DL subframes and UL subframes only using the multiples of 8 ms or 16 ms, namely, supposing that within the 40 ms range, the 8 sets of the DL subframes include {(#7 #23 #31), (#6 #22 #38), (#13 #21 #37), (#12 #28 #36), (#3 #11 #27), (#2 #18 #26), (#1 #17 #33), (#8 #16 #32)}, the corresponding 8 sets of the UL subframes include {(#11 #27 #35), (#10 #26 #42), (#7 #25 #41), (#16 #32 #40), (#7 #15 #31), (#6 #22 #30), (#5 #21 #37), (#12 #20 #36)}, wherein, the subframes greater than "40" can implement modulo calculation for "40" during the calculation process, such as mod (42, 40)=2. Actually, one DL subframe set is corresponding to one UL subframe set, namely, from the overall UL and DL subframe sets, there are 8 DL and UL subframe sets, conditions of combining different sets totally includes 2 to the 8th power of sets (namely, 256 sets). As the DL subframe may have the corresponding UL subframe with 4 ms interval, the feedback of the UL ACK/NACK needs no modification as the LTE, however, when initially switching the subframe configuration, the relation is between the corresponding UL subframe and the DL subframe when switching the subframe configuration may not satisfy the relation of 4 ms any more.

Specifically, the set index is as shown in Table 1, it should be noted that the relation between the set and the set index is not limited to the corresponding relation in Table 1. The 8 bits bitmap mode only exists when distributing the subframes, namely, the binary of 8 bits respectively corresponds to different set indexes, the receiving end can obtain the subframe configuration once obtaining the set index.

TABLE 1

| Set index | DL set | UL set |
| --- | --- | --- |
| 0 | (#7 #23 #31) | (#11 #27 #35) |
| 1 | (#6 #22 #38) | (#10 #26 #42) |
| 2 | (#13 #21 #37) | (#17 #25 #41) |
| 3 | (#12 #28 #36) | (#16 #32 #40) |
| 4 | (#3 #11 #27) | (#7 #15 #31) |
| 5 | (#2 #18 #26) | (#6 #22 #30) |
| 6 | (#1 #17 #33) | (#5 #21 #37) |
| 7 | (#8 #16 #32) | (#12 #20 #36) |

Specifically, the number of HARQ progresses corresponding to the conditions of 256 sets are as shown in Table 2, in which the combination configuration in the first array is decimal, for example, the binary of "170" represented as 8 bits is "10101010", which represents that the sets corresponding to the set indexes which are "7", "5", "3", "1" are combined together.

TABLE 2

| Combination configuration (decimal) | Combination number (256) | Number of HARQ progresses | Number of sets | Number of subframes |
|---|---|---|---|---|
| 0 | 1 | 0 | 0 | 0 |
| 1, 2, 4, 8, 16, 32, 64, 128 | 8 | 1 | 1 | 3 |
| 3, 5, 6, 9, 10, 12, 17, 18, 20, 24, 33, 34, 36, 40, 48, 65, 66, 68, 72, 80, 96, 129, 130, 132, 136, 144, 160, 192 | 28 | 2 | 2 | 6 |
| 7, 11, 13, 14, 19, 21, 22, 25, 26, 28, 35, 37, 38, 41, 42, 44, 49, 50, 52, 56, 67, 69, 70, 73, 74, 76, 81, 82, 84, 85, 88, 97, 98, 100, 104, 112, 131, 134, 137, 138, 140, 145, 146, 148, 152, 161, 162, 164, 168, 170, 176, 193, 194, 196, 200, 208, 224 | 58 | 3 | 3, 4 | 9, 12 |
| 15, 23, 27, 29, 30, 39, 43, 45, 46, 51, 53, 54, 57, 58, 60, 71, 75, 77, 78, 83, 86, 87, 89, 90, 91, 92, 93, 99, 101, 102, 105, 106, 107, 108, 109, 113, 114, 116, 117, 120, 135, 139, 141, 142, 147, 149, 150, 153, 154, 156, 163, 165, 166, 169, 171, 172, 173, 174, 177, 178, 180, 181, 182, 184, 186, 195, 197, 198, 201, 202, 204, 209, 210, 212, 213, 214, 216, 218, 225, 226, 228, 232, 234, 240 | 84 | 4 | 4, 5 | 12, 15 |
| 31, 47, 55, 59, 61, 62, 79, 94, 95, 103, 110, 111, 115, 118, 119, 121, 122, 123, 124, 125, 143, 151, 155, 157, 158, 167, 175, 179, 183, 185, 187, 188, 189, 190, 199, 203, 205, 206, 211, 215, 217, 219, 220, 221, 222, 227, 229, 230, 233, 235, 236, 237, 238, 241, 242, 244, 245, 246, 248, 250 | 60 | 5 | 5, 6 | 15, 18 |
| 63, 126, 127, 159, 191, 207, 223, 231, 239, 243, 247, 249, 251, 252, 253, 254, 255 | 17 | 6 | 6, 7, 8 | 18, 21, 24 |

The inventor finds that a solution of how to feed back the ACK information during switching of backhaul link subframe configuration is not provided in the relevant art.

SUMMARY

Aiming at the problem that a solution of how to feedback the UL ACK/NACK during switching of backhaul link subframe configuration is not provided in the related art, the disclosure provides a solution of feeding back ACK information during switching of backhaul link subframe configuration.

According to one aspect, the disclosure provides a method for feeding back ACK information during switching of backhaul link subframe configuration, including: during the switching of the backhaul link subframe configuration, if UL ACK/NACK information, which corresponds to a last transmission before the switching of one or more DL HARQ transmissions is not fed back on a UL subframe before the switching, is feeding back the ACK/NACK information on an available UL subframe which is after the switching since N millisecond (ms) after the last transmission, wherein N is an integer.

Preferably, the available UL subframe which is after the switching is the first available UL subframe which is after the switching since Nms after the last transmission.

Preferably, N is equal to 4.

Preferably, during the switching the UL ACK/NACK information, which corresponds to the last transmission before the switching of the DL HARQ transmissions is fed back on the same UL subframe which is after the switching.

Preferably, during the switching, the UL ACK/NACK information, which corresponds to the last transmission before the switching of the one or more DL HARQ transmissions, and is not fed back on the UL subframe which is before the switching, and the UL ACK/NACK information, which corresponds to one or more DL HARQ transmissions are fed back on the same UL subframe which is after the switching.

Preferably, during the switching, the UL ACK/NACK information, which corresponds to the last transmission of different HARQ transmissions before the switching is fed back on different UL subframes which are after the switching.

Preferably, a feedback mode of the UL ACK/NACK information is the same as any one of feedback modes of the UL ACK/NACK information in LTE and LTE-A systems.

Preferably, the feedback mode of the UL ACK/NACK information includes at is least one of the following: format 1/1a/1b: the UL ACK/NACK information to be fed back is born on a corresponding resource to be fed back after spreading spectrum in frequency and time directions; format 2/2a/2b: the UL ACK/NACK information to be fed back is born on the resource to be fed back, wherein the resource corresponds to an OFDM symbol of a Demodulation Reference Signal (DMRS) to be fed back; and format 3: the UL ACK/NACK information to be fed back is loaded on the corresponding resource to be fed back after spreading spectrum in the time direction.

According to another aspect, the disclosure provides a device for feeding back ACK information during switching of backhaul link subframe configuration, including: a determining module, configured to determine that the UL ACK/NACK information, which corresponds to a last transmission before the switching of one or more DL HARQ transmissions is not fed back on a UL subframe which is before the switching, during the switching of backhaul link subframe configuration; and a feedback module, configured to feed back the ACK/NACK information on an available UL subframe which is after the switching since Nms after the last transmission, wherein N is an integer.

Preferably, the feedback module is configured to feed back the ACK/NACK information on the first available UL subframe which is after the switching since Nms after the last transmission.

Preferably, N is equal to 4.

Preferably, during the switching, the feedback module is configured to feed back the UL ACK/NACK information, which corresponds to the last transmission before the switching of the DL HARQ transmissions on the same UL subframe which is after the switching.

Preferably, during the switching, the feedback module is configured to feed back the UL ACK/NACK information, which corresponds to the last transmission before the switching of the one or more DL HARQ transmissions and is not fed back on the UL subframe which is before the switching, and the UL ACK/NACK information, which corresponds to one or more DL HARQ transmissions on the same UL subframe which is after the switching.

Preferably, during the feedback, the feedback module is set to feed back the UL ACK/NACK information, which corresponds to the last transmissions of different HARQ transmissions before the switching on different UL subframes which is after the switching.

Preferably, the feedback mode of the UL ACK/NACK information is the same as any one of feedback modes of the UL ACK/NACK information in the LTE and LTE-A systems.

The disclosure adopts the mode of feeding back the ACK/NACK information on the available switched UL subframe since Nms after the last transmission, in the case that the UL ACK/NACK information corresponding to the last transmission of the DL HARQ transmissions during the switching is not fed back on the UL subframe before the switching, thus achieving the effect of correctly feeding back the ACK information during the switching of backhaul link subframe configuration.

BRIEF DESCRIPTION OF THE DRAWINGS

Drawings, provided for further understanding of the present invention and forming a part of the specification, are used to explain the present invention together with embodiments of the present invention rather than to limit the present invention, wherein.

DETAILED DESCRIPTION OF THE EMBODIMENTS

The preferred embodiments are described in conjunction with the drawings as follows. It shall be understood that the embodiments of the present application and the features of the embodiments can be combined with each other if there is no conflict.

Embodiment 1

Figure 1:
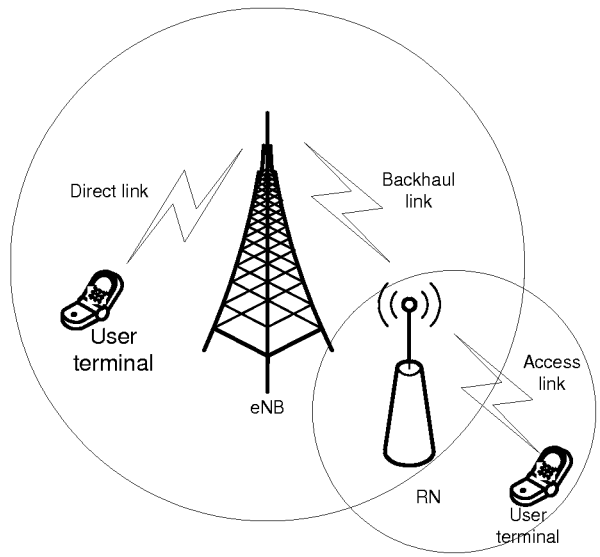
FIG. 1 shows a system structure diagram according to the related art.
Figure 2:
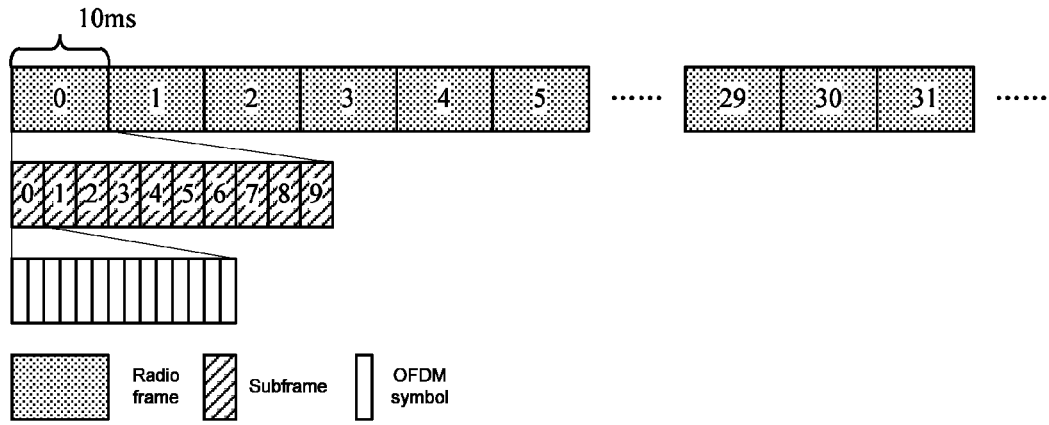
FIG. 2 shows a frame structure diagram according to the related art.
Figure 3:
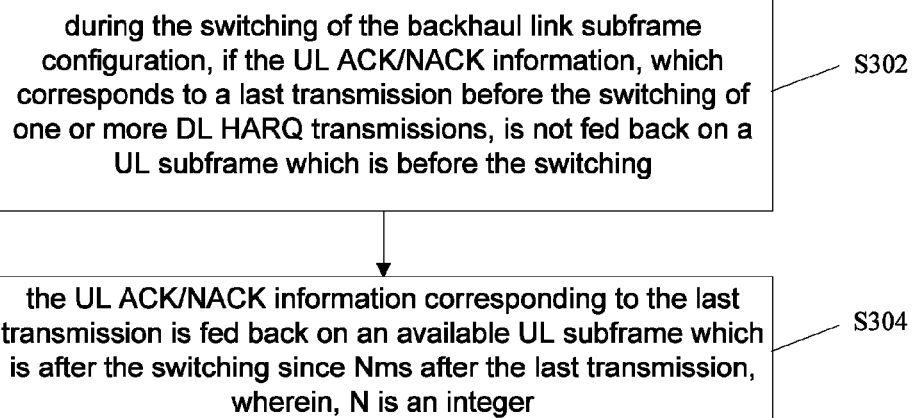
FIG. 3 shows flowchart of a method for feeding back ACK information during switching of backhaul link subframe configuration according to an embodiment of the disclosure.

The embodiment of the disclosure provides a method for feeding back ACK information during switching of backhaul link subframe configuration. FIG. 3 shows a flowchart of a method for feeding back ACK information during switching of backhaul is link subframe configuration according to an embodiment of the disclosure, and the method includes the following Steps S302 to S304.

Step S302, during the switching of the backhaul link subframe configuration, if the UL ACK/NACK information, which corresponds to a last transmission before the switching of one or more DL HARQ transmissions, is not fed back on a UL subframe which is before the switching.

Step S304, the UL ACK/NACK information corresponding to the last transmission is fed back on an available UL subframe which is after the switching since Nms after the last transmission, wherein, N is an integer.

In the embodiment, in the case that the UL ACK/NACK information, which corresponds to the last transmission before the switching of the DL HARQ transmissions, is not fed back on the UL subframe which is before the switching, the ACK/NACK information is fed back on the available UL subframe which is after the switching since Nms after the last transmission; via the mode, it solves the problem that how to feed back the UL ACK/NACK during the switching of backhaul link subframe configuration is not clear in the relevant art, without introducing signaling overhead.

For example, the available UL subframe which is after the switching is the first available UL subframe which is after the switching since Nms after the last transmission.

Preferably, N is equal to 4.

In a preferred implementation mode of the embodiment of the disclosure, during the switching, the UL ACK/NACK information, which corresponds to the last transmission before the switching of the DL HARQ transmissions before the switching can be fed back on the same switched UL subframe.

In another preferred implementation mode of the embodiment of the disclosure, during the switching, the UL ACK/NACK information, which corresponds to the last transmission before the switching of the one or more DL HARQ transmissions and is not fed back on the UL subframe which is before the switching, and the UL ACK/NACK information, which corresponds to one or more DL HARQ transmissions, may be fed back on the same UL subframe which is after the switching.

In another preferred implementation mode of the embodiment of the disclosure, during the switching, the UL ACK/NACK information, which corresponds to the last transmission of different HARQ transmissions before the switching, may be fed back on different UL subframes which are after the switching.

Preferably, a feedback mode of the UL ACK/NACK information is the same as any one of feedback modes of the UL ACK/NACK information in LTE and LTE-A systems. The feedback mode of the UL ACK/NACK information includes at least one of the following: format 1/1a/1b: the UL ACK/NACK information to be fed back is born on a corresponding resource to be fed back after spreading spectrum in frequency and time directions; format 2/2a/2b: the UL ACK/NACK information to be fed back is born on the resource to be fed back, wherein the resource corresponds to an OFDM symbol of a DMRS; format 3: the UL ACK/NACK information to be fed back is born on the corresponding resource to be fed back after spreading spectrum in the time direction. This embodiment realizes backward compatibility.

The embodiment of the disclosure provides a method for feeding back ACK information during switching of backhaul link subframe configuration, which can be suitable for the links from the eNB to the RN; in the case of not introducing the signaling overhead, the method not only guarantees the backward compatibility (for example, the compatible LTE system), but also solves the problem of how to feed back the UL ACK/NACK during the switching of the backhaul link subframe configuration.

Embodiment 2

In the embodiment of the disclosure,

DL subframe number=10*System Frame Number (SFN)+DL subframe index,

UL subframe number=10*SFN+UL subframe index, where, SFN represents the System Frame Number (also named as SF number); the DL subframe index represents indexes of 10 subframes contained in one frame, of which the range is (#0, #1, #2, #3, #4, #5, #6, #7, #8, #9); the UL subframe index represents indexes of 10 subframes contained in one frame, of which the range is (#0, #1, #2, #3, #4, #5, #6, #7, #8, #9).

The embodiments of the disclosure will be described hereinafter in detail in conjunction with the drawings thereof. All the examples adopt the method in the embodiment 1 to feed back the ACK information.

EXAMPLE 1

Figure 4:
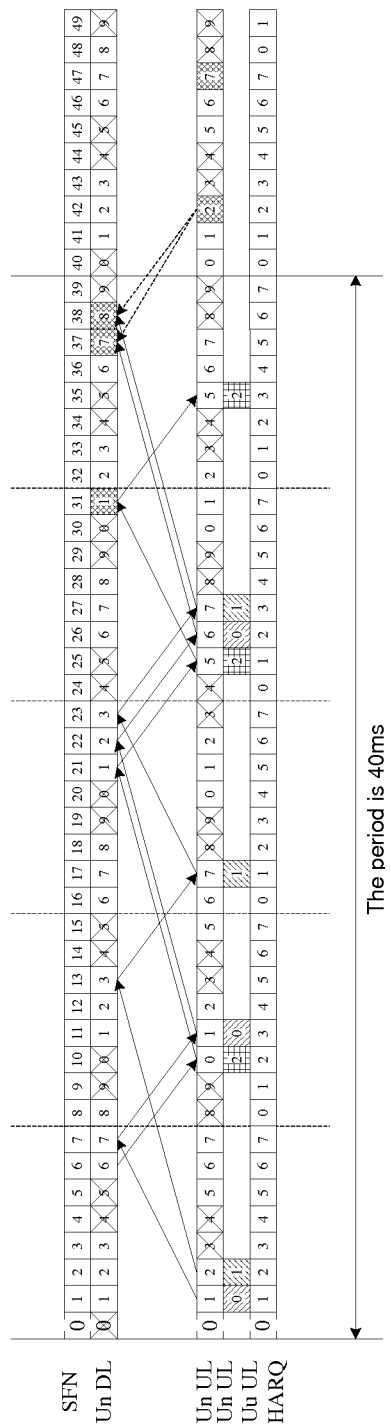
FIG. 4 shows a diagram 1 of feeding back UL ACK/NACK during switching of subframe configuration according to an embodiment of the disclosure.

Suppose that the current switching period is 40 ms, and Nms is equal to 4 ms. FIG. 4 shows a diagram 1 for feeding back UL ACK/NACK during switching of subframe configuration according to an embodiment of the disclosure, as shown in FIG. 4, a subframe combination signaling, which is corresponding to the subframe configuration before the switching is decimal "7" or binary "00000111", the results of performing modulo operation on the corresponding DL subframe numbers, which are within the last 10 ms before the switching, by 10 are "1", "7", and "8"; the subframe combination signaling corresponding to the subframe configuration after the switching is decimal "19" or binary "00010011", the result of performing modulo operation on the corresponding UL subframe numbers, which are within the first 10 ms after the switching, by 10 are "2", and "7".

The UL ACK/NACK corresponding to the corresponding DL subframe, which is corresponding to "1" after performing modulo operation on the corresponding DL subframe number by 10 before the switching, can be fed back on the UL subframe, which is corresponding to "5" after performing modulo operation on the corresponding UL subframe number by 10 before the switching; the UL ACK/NACK corresponding to the DL subframes, which are corresponding to "7", "8" after performing modulo operation on the corresponding DL subframe numbers by 10 before switching, may be fed back on the first available UL subframe after 4 ms or more; the corresponding UL ACK/NACK in the example may be fed back on the UL subframe which is corresponding to "2" after performing modulo operation on the corresponding UL subframe number by 10 after switching, wherein, the feedback interval between the DL frame, which is corresponding to "7" after performing modulo operation on the corresponding DL subframe number by 10 before switching, and the UL ACK/NACK is 5 ms, the feedback interval between the DL subframe, which is corresponding to "8" after performing modulo operation on the corresponding DL subframe number by 10 before switching, and the UL ACK/NACK is 4 ms; all the intervals can meet the requirements of being larger than or equal to 4 ms. (performing modulo operation on the corresponding DL subframe number by 10 before switching represents performing modulo operation on the corresponding DL subframe number by 10 within the last 10 ms before switching; performing modulo operation on the corresponding UL subframe number by 10 after switching represents performing modulo operation on the corresponding UL subframe number by 10 within the first 10 ms after switching, they are not repeated any more. The dotted arrows in FIG. 4 to FIG. 10 represent the feedback relation, and are not repeated.)

EXAMPLE 2

Figure 5:
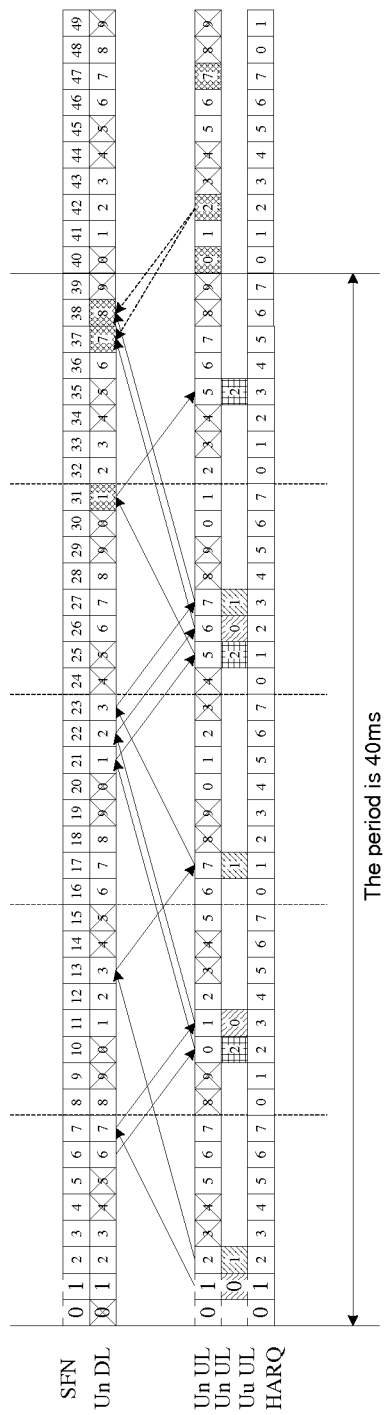
FIG. 5 shows a diagram 2 of feeding back UL ACK/NACK during switching of subframe configuration according to an embodiment of the disclosure.

Suppose that the current switching period is 40 ms, and Nms is equal to 4 ms. FIG. 5 shows a diagram 2 for feeding back UL ACK/NACK during switching of subframe configuration according to an embodiment of the disclosure, as shown in FIG. 5, the subframe combination signaling, which corresponds to the subframe configuration before the switching is decimal "7" or binary "00000111", the results of performing modulo operation on the corresponding DL subframe numbers, which are within the last 10 ms before the switching, by 10 are "1", "7", and "8"; the subframe combination signaling, which corresponds to the subframe configuration after the switching is decimal "27" or binary "00011011", the results of performing is modulo operation on the corresponding UL subframe numbers, which are within the first 10 ms after the switching, by 10 are "0", "2", and "7".

The UL ACK/NACK corresponding to the DL subframe, which is corresponding to "1" after performing modulo operation on the corresponding DL subframe number by 10 before the switching, may be fed back on the UL subframe, which is corresponding to "5" after performing modulo operation on the corresponding UL subframe number by 10 before the switching; the UL ACK/NACK corresponding to the DL subframes, which are corresponding to "7", "8" after performing modulo operation on the corresponding DL subframe numbers by 10 before switching, may be fed back on the first available UL subframe after 4 ms or more; although the UL subframe, which is corresponding to "0" after performing modulo operation on the corresponding DL subframe number by 10 after switching, is the first available UL subframe after the switching, it cannot meet the requirements of 4 ms, the corresponding UL ACK/NACK can be fed back on the UL subframe which is corresponding to "2" after performing modulo operation on the corresponding UL subframe number by 10 after the switching.

EXAMPLE 3

Figure 6:
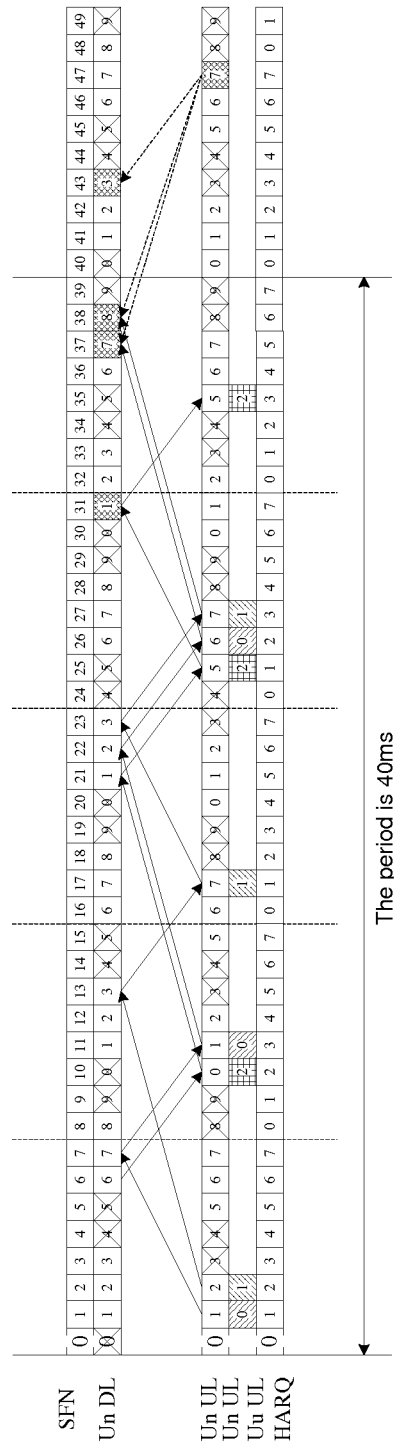
FIG. 6 shows a diagram 3 of feeding back UL ACK/NACK during switching of subframe configuration according to an embodiment of the disclosure.

Suppose that the current switching period is 40 ms, and Nms is equal to 4 ms. FIG. 6 shows a diagram 3 for feeding back UL ACK/NACK during switching of subframe configuration according to an embodiment of the disclosure, as shown in FIG. 6, a subframe combination signaling, which is corresponding to the subframe configuration before the switching, is decimal "7" or binary "00000111", the results of performing modulo operation on the corresponding DL subframe numbers, which are within the last 10 ms before the switching, by 10 are "1", "7", and "8"; a subframe combination signaling, which is corresponding to the subframe configuration after the switching, is decimal "16" or binary "00010000", the result of performing modulo operation on the corresponding UL subframe number, which is within the first 10 ms after the switching, by 10 is "3".

The UL ACK/NACK corresponding to the DL subframe, which is corresponding to "1" after performing modulo operation on the corresponding DL subframe number by 10 before the switching, can be fed back on the UL subframe which is corresponding to "5" after performing modulo operation on the corresponding UL subframe number by 10 before the switching; the UL ACK/NACK corresponding to the DL subframes, which are corresponding to "7", "8" after performing modulo operation on the corresponding DL subframe numbers by 10 before switching, can be fed back on the UL subframe, which is corresponding to "7" after performing modulo operation on the corresponding UL subframe number by 10 after the switching; the UL ACK/NACK corresponding to the DL subframe, which is corresponding to "3" after performing modulo operation on the corresponding DL subframe number by 10 after switching, may be fed back on the UL subframe, which is corresponding to "7" after performing modulo operation on the corresponding UL subframe number by 10 after the switching.

EXAMPLE 4

Figure 7:
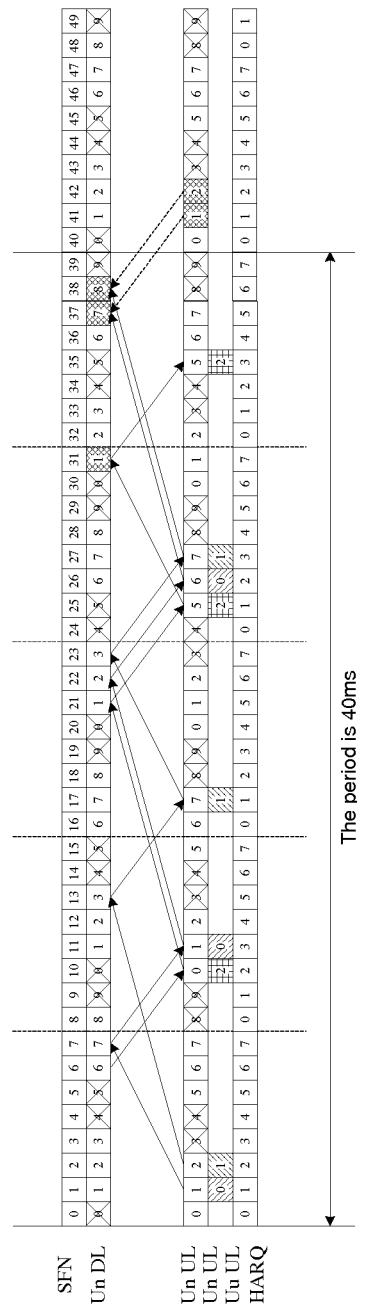
FIG. 7 shows a diagram 4 of feeding back UL ACK/NACK during switching of subframe configuration according to an embodiment of the disclosure.

Suppose that the current switching period is 40 ms, and Nms is equal to 4 ms. FIG. 7 shows a diagram 4 for feeding back UL ACK/NACK during switching of subframe configuration according to an embodiment of the disclosure, as shown in FIG. 7, a subframe combination signaling, which is corresponding to the subframe configuration before the switching, is decimal "7" or binary "00000111", the results of performing modulo operation on the corresponding DL subframe numbers, which are within the last 10 ms before the switching, by 10 are "1", "7", and "8"; the subframe combination signaling, which is corresponding to the subframe configuration after the switching, is decimal "7" or binary "00000111", the results of performing modulo operation on the corresponding UL subframe numbers, which are within the first 10 ms after the switching, by 10 are "1", and "2".

The UL ACK/NACK corresponding to the DL subframe, which is corresponding to "1" after performing modulo operation on the corresponding DL subframe number by 10 before switching, may be fed back on the UL subframe, which is is corresponding to "5" after performing modulo operation on the corresponding UL subframe number by 10 before switching; the UL ACK/NACK corresponding to the DL subframe, which is corresponding to "7" after performing modulo operation on the corresponding DL subframe number by 10 before switching, may be fed back on the UL subframe, which is corresponding to "1" after performing modulo operation on the corresponding UL subframe number by 10 after switching; the UL ACK/NACK corresponding to the DL subframe which is corresponding to "8" after performing modulo operation on the corresponding DL subframe number by 10 before switching may be fed back on the UL subframe, which is corresponding to "2" after performing modulo operation on the corresponding UL subframe number by 10 after switching.

EXAMPLE 5

Figure 8:
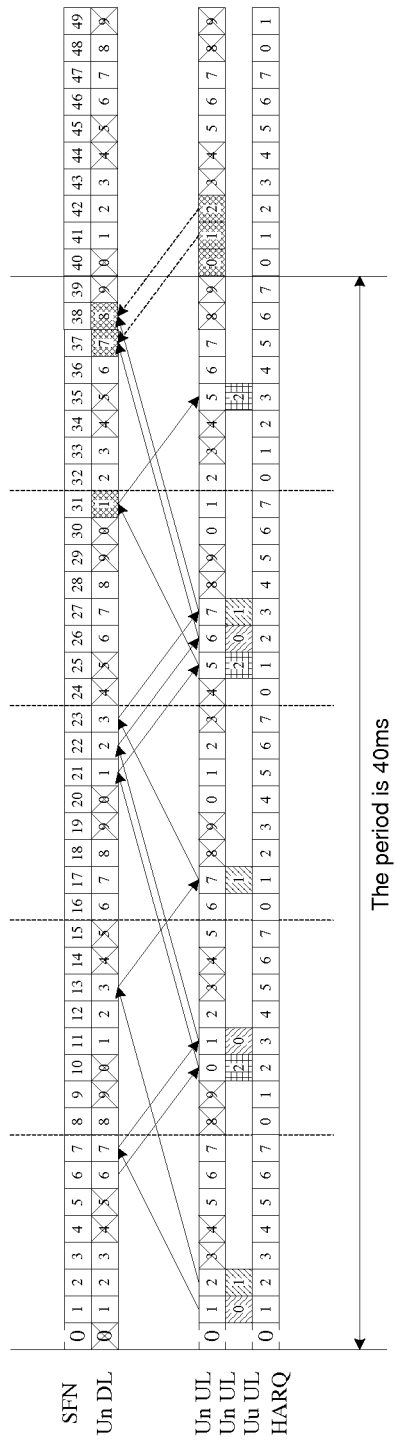
FIG. 8 shows a diagram 5 of feeding back UL ACK/NACK during switching of subframe configuration according to an embodiment of the disclosure.

Suppose that the current switching period is 40 ms, and Nms is equal to 4 ms. FIG. 8 shows a diagram 5 for feeding back UL ACK/NACK during switching of subframe configuration according to an embodiment of the disclosure, as shown in FIG. 8, a subframe combination signaling, which is corresponding to the subframe configuration before the switching, is decimal "7" or binary "00000111", and the results of performing modulo operation on the corresponding DL subframe numbers, which are within the last 10 ms before the switching, by 10 are "1", "7", and "8"; a subframe combination signaling, which is corresponding to the subframe configuration after the switching, is decimal "15" or binary "00001111", the results of performing modulo operation on the corresponding UL subframe numbers, which are within the first 10 ms after the switching, by 10 are "0", "1", and "2".

The UL ACK/NACK corresponding to the DL subframe, which is corresponding to "1" after performing modulo operation on the corresponding DL subframe number by 10 before switching, may be fed back on the UL subframe, which is corresponding to "5" after performing modulo operation on the corresponding UL subframe number by 10 before switching; the UL ACK/NACK corresponding to the DL frames, which are corresponding to "7", "8" after performing modulo operation on the corresponding DL subframe numbers by 10 before switching, may be fed back is on the first available UL subframe after 4 ms or more; in the example, although the UL subframe, which is corresponding to "0" after performing modulo operation on the corresponding UL subframe number by 10 after switching, is the first available UL subframe, it cannot meet the requirements of 4 ms, the UL ACK/NACK corresponding to the DL subframe, which is corresponding to "7" after performing modulo operation on the corresponding DL subframe number by 10 before switching, may be fed back on the UL subframe, which is corresponding to "1" after performing modulo operation on the corresponding UL subframe number by 10; the UL ACK/NACK corresponding to the DL subframe, which is corresponding to "8" after performing modulo operation on the corresponding DL subframe number by 10 before switching, may be fed back on the UL subframe, which is corresponding to "2" after performing modulo operation on the corresponding UL subframe number by 10 after switching.

EXAMPLE 6

Figure 9:
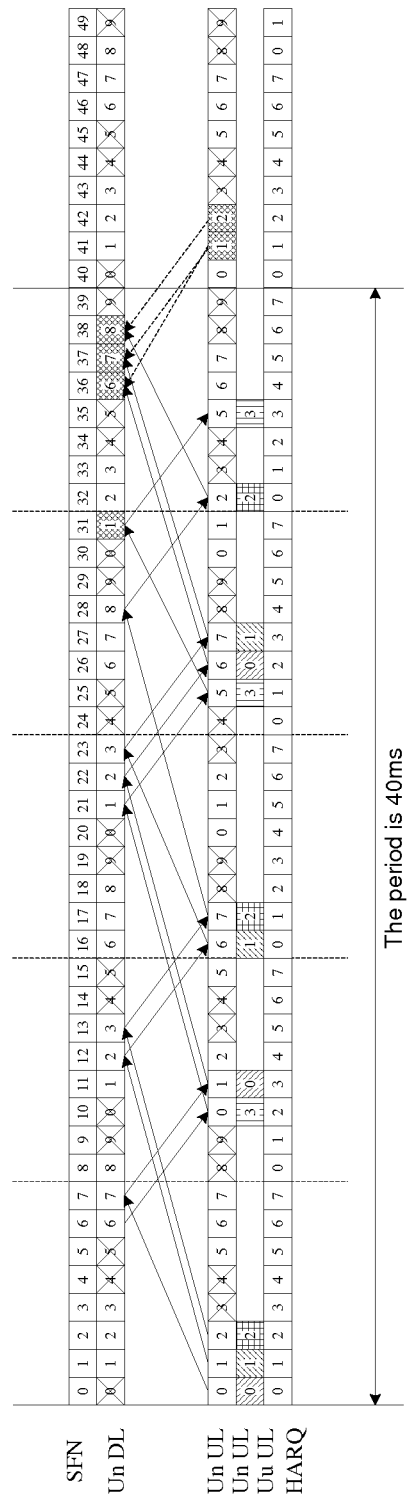
FIG. 9 shows a diagram 6 of feeding back UL ACK/NACK during switching of subframe configuration according to an embodiment of the disclosure.

Suppose that the current switching period is 40 ms, and Nms is equal to 4 ms. FIG. 9 shows a diagram 6 for feeding back UL ACK/NACK during switching of subframe configuration according to an embodiment of the disclosure, as shown in FIG. 9, a subframe combination signaling, which is corresponding to the subframe configuration before the switching, is decimal "15" or binary "00000111", and the results of performing modulo operation on the corresponding DL subframe numbers, which are within the last 10 ms before the switching, by 10 are "1", "6", "7", and "8"; a subframe combination signaling, which is corresponding to the subframe configuration after the switching, is decimal "7" or binary "00000111", and the results of performing modulo operation on the corresponding UL subframe numbers, which are within the first 10 ms after the switching, by 10 are "1", and "2".

The UL ACK/NACK corresponding to the DL subframe, which is corresponding to "1" after performing modulo operation on the corresponding DL subframe number by 10 before switching, may be fed back on the UL subframe, which is corresponding to "5" after performing modulo operation on the corresponding UL subframe number by 10 before switching; the UL ACK/NACK corresponding to the is DL subframes, which are corresponding to "6", "7" after performing modulo operation on the corresponding DL subframe numbers by 10 before switching, may be fed back on the UL subframe, which is corresponding to "1" after performing modulo operation on the UL subframe number by 10 after switching; the UL ACK/NACK corresponding to the DL subframe, which is corresponding to "8" after performing modulo operation on the DL subframe number by 10 before switching, may be fed back on the UL subframe, which is corresponding to "2" after performing modulo operation on the UL subframe by 10 after switching.

EXAMPLE 7

Figure 10:
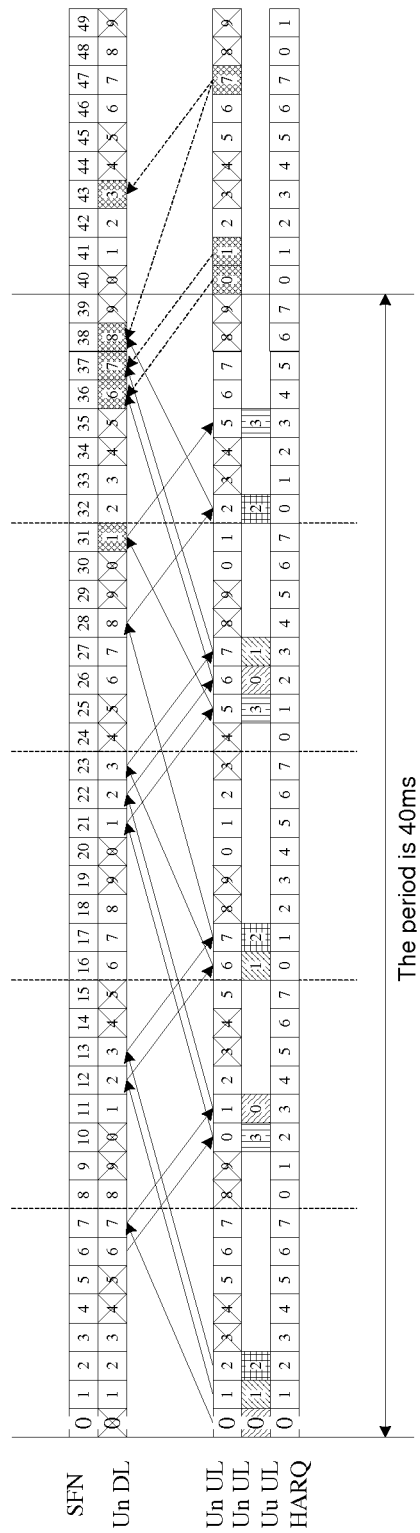
FIG. 10 shows a diagram 7 of feeding back UL ACK/NACK during switching of subframe configuration according to an embodiment of the disclosure.

Suppose that the current switching period is 40 ms, and Nms is equal to 4 ms. FIG. 10 shows a diagram 7 for feeding back UL ACK/NACK during switching of subframe configuration according to an embodiment of the disclosure, as shown in FIG. 10, a subframe combination signaling, which is corresponding to the subframe configuration before the switching, is decimal "15" or binary "00001111", the result of performing modulo operation on the corresponding DL subframe numbers, which are within the last 10 ms before the switching, by 10 are "1", "6", "7", and "8"; a subframe combination signaling, which is corresponding to the subframe configuration after the switching, is decimal "28" or binary "00011100", and the results of performing modulo operation on the corresponding UL subframe numbers, which are within the first 10 ms after the switching, by 10 are "0", "1", and "7".

The UL ACK/NACK corresponding to the DL subframe, which is corresponding to "1" after performing modulo operation on the corresponding DL subframe number by 10 before switching, may be fed back on the UL subframe, which is corresponding to "5" after performing modulo operation on the corresponding UL subframe number by 10 before switching; the UL ACK/NACK corresponding to the DL subframe, which is corresponding to "6" after i performing modulo operation on the corresponding DL subframe number by 10 before switching, may be fed back on the UL subframe, which is corresponding to "0" after performing modulo operation on the corresponding UL subframe number by 10 after switching; the UL ACK/NACK corresponding to the DL subframe, which is corresponding to "7" after performing modulo operation on the corresponding DL subframe number by 10, may be fed back on the UL subframe, which is corresponding to "1" after performing modulo operation on the corresponding UL subframe number by 10 after switching; the UL ACK/NACK corresponding to the DL subframe, which is corresponding to "8" after performing modulo operation on the corresponding DL subframe number by 10 before switching, may be fed back on the UL subframe, which is corresponding to "7" after performing modulo operation on the corresponding UL subframe number by 10 after switching; the UL ACK/NACK corresponding to the DL subframe, which is corresponding to "3" after performing modulo operation on the corresponding DL subframe number by 10 after switching, may be fed back on the UL subframe, which is corresponding to "7" after performing modulo operation on the corresponding UL subframe number by 10 after switching.

Embodiment 3

In this embodiment and the above embodiments, the feedback mode of the UL ACK/NACK information is the same as any one of the feedback modes of the UL ACK/NACK information in the LTE and LTE-A systems. For example, the feedback mode of the UL ACK/NACK information can be at least one of the following:

format 1/1a/1b: the UL ACK/NACK information to be fed back is born on a corresponding resource to be fed back after spreading spectrum in frequency and time directions;

format 2/2a/2b: the UL ACK/NACK information to be fed back is born on the resource to be fed back, wherein the resource corresponds to an OFDM symbol of a DMRS;

format 3: the UL ACK/NACK information to be fed back is born on the corresponding resource to be fed back after spreading spectrum in the time direction.

This embodiment realizes backward compatibility.

Embodiment 4

The embodiment of the disclosure also provides a device for feeding back ACK information during switching of backhaul link subframe configuration; this device is configured to implement the above methods. Preferably, the device may be the RN.

Figure 11:
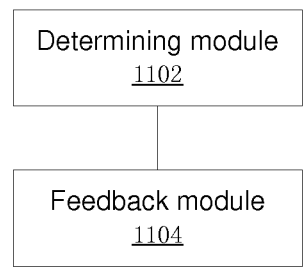
FIG. 11 shows a structure diagram of a device for feeding back ACK information during switching of backhaul link subframe configuration according to an embodiment of the disclosure.

FIG. 11 shows a structure diagram of a device for feeding back ACK information during switching of backhaul link subframe configuration according to an embodiment of the disclosure; as shown in FIG. 11, the device includes a determining module 1102, which is configured to determine that the UL ACK/NACK information, which corresponds to a last transmission before the switching of one or more DL HARQ transmissions, is not fed back on a UL subframe which is before the switching, when switching the backhaul link subframe configuration; and a feedback module 1104, which is coupled to the determining module 1102, and configured to feed back the ACK/NACK information on an available UL subframe which is after the switching since Nms after the last transmission, wherein N is an integer.

Preferably, the feedback module 1104 is configured to feed back the ACK/NACK information on the first available UL subframe which is after the switching since Nms after the last transmission.

Preferably, N is equal to 4.

In a preferred example of the embodiment of the disclosure, during the switching the feedback module 1104 is configured to feed back the UL ACK/NACK information, which corresponds to the last transmission before the switching of the DL HARQ transmissions on the same UL subframe which is after the switching.

In another preferred example of the embodiment of the disclosure, during the switching, the feedback module 1104 is configured to feed back the UL ACK/NACK information, which corresponds to the last transmission before the switching of the one or more DL HARQ transmissions, and is not fed back on the UL subframe which is before the switching, and the UL ACK/NACK information, which corresponds to is the one or more DL HARQ transmissions on the same UL subframe which is after the switching.

In another preferred example of the embodiment of the disclosure, during the switching, the feedback module 1104 is configured to feed back the UL ACK/NACK information, which corresponds to the last transmissions of different HARQ transmissions before the switching on different UL subframes which is after the switching.

Preferably, the feedback mode of the UL ACK/NACK information is the same as any one of the feedback nodes of the UL ACK/NACK information in the LTE and LTE-A systems. In the above, the feedback mode of the UL ACK/NACK information also can adopt the feedback mode in the embodiment 3.

In conclusion, the method provided by the embodiments of the disclosure can be suitable for the links from the eNB to the RN; in the case of not introducing the signaling overhead, this method not only guarantees the backward compatibility (for example, the compatible LTE system), but also solves the problem of how to feed back the UL ACK/NACK during switching of the backhaul link subframe configuration.

Obviously, those skilled in the art shall understand that the above-mentioned modules and steps of the present invention can be realized by using general purpose calculating device, can be integrated in one calculating device or distributed on a network which consists of a plurality of calculating devices. Alternatively, the modules and the steps of the present invention can be realized by using the executable program code of the calculating device. Consequently, they can be stored in the storing device and executed by the calculating device, or they are made into integrated circuit module respectively, or a plurality of modules or steps thereof are made into one integrated circuit module. In this way, the present invention is not restricted to any particular hardware and software combination.

The descriptions above are only the preferable embodiment of the present invention, which are not used to restrict the present invention. For those skilled in the art, the present invention may have various changes and variations. Any amendments, equivalent substitutions, improvements, etc. within the principle of the present invention are all included in the scope of the protection of the present invention.

What is claimed is:

1. A method for feeding back Acknowledgment (ACK) information during switching of a backhaul link subframe configuration, comprising:
   during the switching of the backhaul link subframe configuration, when Uplink (UL) ACK/ Negative ACK (NACK) information, which corresponds to a last transmission before the switching of one or more Downlink (DL) Hybrid Automatic Repeat Request (HARQ) transmissions, is not fed back on a UL subframe before the switching, feeding back the ACK/NACK information on an available UL subframe which is after the switching and at least N millisecond(ms) after the last transmission, wherein N is an integer.

2. The method according to claim 1, wherein the available UL subframe which is after the switching is the first available UL subframe which is after the switching and at least Nms after the last transmission.

3. The method according to claim 2, wherein a feedback mode of the UL ACK/NACK information is the same as a feedback mode of the UL ACK/NACK information in Long Term Evolution (LTE) and Long Term Evolution Advanced (LTE-A) systems.

4. The method according to claim 2, wherein the feedback mode of the UL ACK/NACK information comprises at least one of the following:
   format 1/1a/1b: the UL ACK/NACK information to be fed back is born on a corresponding resource to be fed back after spreading spectrum in frequency and time directions;
   format 2/2a/2b: the UL ACK/NACK information to be fed back is born on the resource to be fed back, wherein the resource corresponds to an Orthogonal Frequency Division Multiplexing (OFDM) symbol of a Demodulation Reference Signal (DMRS); and
   format 3: the UL ACK/NACK information to be fed back is born on the corresponding resource to be fed back after spreading spectrum in the time direction.

5. The method according to claim 1, wherein N is equal to 4.

6. The method according to claim 5, wherein a feedback mode of the UL ACK/NACK information is the same as a feedback mode of the UL ACK/NACK information in Long Term Evolution (LTE) and Long Term Evolution Advanced (LTE-A) systems.

7. The method according to claim 5, wherein the feedback mode of the UL ACK/NACK information comprises at least one of the following:
   format 1/1a/1b: the UL ACK/NACK information to be fed back is born on a corresponding resource to be fed back after spreading spectrum in frequency and time directions;
   format 2/2a/2b: the UL ACK/NACK information to be fed back is born on the resource to be fed back, wherein the resource corresponds to an Orthogonal Frequency Division Multiplexing (OFDM) symbol of a Demodulation Reference Signal (DMRS); and
   format 3: the UL ACK/NACK information to be fed back is born on the corresponding resource to be fed back after spreading spectrum in the time direction.

8. The method according to claim 1, wherein the UL ACK/NACK information, which corresponds to the last transmission before the switching of the DL HARQ transmissions, is fed back on the same UL subframe which is after the switching.

9. The method according to claim 8, wherein a feedback mode of the UL ACK/NACK information is the same as a feedback mode of the UL ACK/NACK information in Long Term Evolution (LTE) and Long Term Evolution Advanced (LTE-A) systems.

10. The method according to claim 8, wherein the feedback mode of the UL ACK/NACK information comprises at least one of the following:
   format 1/1a/1b: the UL ACK/NACK information to be fed back is born on a corresponding resource to be fed back after spreading spectrum in frequency and time directions;
   format 2/2a/2b: the UL ACK/NACK information to be fed back is born on the resource to be fed back, wherein the resource corresponds to an Orthogonal Frequency Division Multiplexing (OFDM) symbol of a Demodulation Reference Signal (DMRS); and
   format 3: the UL ACK/NACK information to be fed back is born on the corresponding resource to be fed back after spreading spectrum in the time direction.

11. The method according to claim 1, wherein the UL ACK/NACK information, which corresponds to the last transmission before the switching of the one or more DL HARQ transmissions and is not fed back on the UL subframe before the switching, and UL ACK/NACK information which corresponds to one or more DL HARQ transmissions after the switching, are fed back on the same UL subframe which is after the switching.

12. The method according to claim 11, wherein a feedback mode of the UL ACK/NACK information is the same as a feedback mode of the UL ACK/NACK information in Long Term Evolution (LTE) and Long Term Evolution Advanced (LTE-A) systems.

13. The method according to claim 11, wherein the feedback mode of the UL ACK/NACK information comprises at least one of the following:
   format 1/1a/1b: the UL ACK/NACK information to be fed back is born on a corresponding resource to be fed back after spreading spectrum in frequency and time directions;
   format 2/2a/2b: the UL ACK/NACK information to be fed back is born on the resource to be fed back, wherein the resource corresponds to an Orthogonal Frequency Division Multiplexing (OFDM) symbol of a Demodulation Reference Signal (DMRS); and
   format 3: the UL ACK/NACK information to be fed back is born on the corresponding resource to be fed back after spreading spectrum in the time direction.

14. The method according to claim 1, wherein the UL ACK/NACK information, which corresponds to the last transmission of different HARQ transmissions before the switching is fed back on different UL subframes which are after the switching.

15. The method according to claim 14, wherein a feedback mode of the UL ACK/NACK information is the same as a feedback mode of the UL ACK/NACK information in Long Term Evolution (LTE) and Long Term Evolution Advanced (LTE-A) systems.

16. The method according to claim 14, wherein the feedback mode of the UL ACK/NACK information comprises at least one of the following:
   format 1/1a/1b: the UL ACK/NACK information to be fed back is born on a corresponding resource to be fed back after spreading spectrum in frequency and time directions;
   format 2/2a/2b: the UL ACK/NACK information to be fed back is born on the resource to be fed back, wherein the resource corresponds to an Orthogonal Frequency Division Multiplexing (OFDM) symbol of a Demodulation Reference Signal (DMRS); and
   format 3: the UL ACK/NACK information to be fed back is born on the corresponding resource to be fed back after spreading spectrum in the time direction.

17. The method according to claim 1, wherein a feedback mode of the UL ACK/NACK information is the same as a feedback mode of the UL ACK/NACK information in Long Term Evolution (LTE) and Long Term Evolution Advanced (LTE-A) systems.

18. The method according to claim 1, wherein the feedback mode of the UL ACK/NACK information comprises at least one of the following:
   format 1/1a/1b: the UL ACK/NACK information to be fed back is born on a corresponding resource to be fed back after spreading spectrum in frequency and time directions;
   format 2/2a/2b: the UL ACK/NACK information to be fed back is born on the resource to be fed back, wherein the resource corresponds to an Orthogonal Frequency Division Multiplexing (OFDM) symbol of a Demodulation Reference Signal (DMRS); and
   format 3: the UL ACK/NACK information to be fed back is born on the corresponding resource to be fed back after spreading spectrum in the time direction.

19. A device for feeding back ACK information during switching of backhaul link subframe configuration, comprising a hardware processor configured to execute stored software comprising:
   a determining module, configured to determine that Uplink (UL) ACK/Negative ACK(NACK) information, which corresponds to a last transmission before the switching of one or more Downlink(DL) Hybrid Automatic Repeat Request(HARQ) transmissions, is not fed back on a UL subframe before the switching, during the switching of backhaul link subframe configuration; and
   a feedback module, configured to feed back the ACK/NACK information on an available UL subframe which is after the switching and at least N millisecond(ms) after the last transmission in response to UL ACK/NCK information not being fed back on the UL subframe before the switching, wherein N is an integer.

20. The device according to claim 19, wherein the feedback module is configured to feed back the ACK/NACK information on the first available UL subframe which is after the switching and at least Nms after the last transmission.

21. The device according to claim 20, wherein a feedback mode of the UL ACK/NACK information is the same as a feedback mode of the UL ACK/NACK information in LTE and LTE-A systems.

22. The device according to claim 19, wherein, N is equal to 4.

23. The device according to claim 22, wherein a feedback mode of the UL ACK/NACK information is the same as a feedback mode of the UL ACK/NACK information in LTE and LTE-A systems.

24. The device according to claim 19, wherein the feedback module is configured to feed back the UL ACK/NACK information, which corresponds to the last transmission before the switching of the DL HARQ transmissions, on the same UL subframe which is after the switching.

25. The device according to claim 24, wherein a feedback mode of the UL ACK/NACK information is the same as a feedback mode of the UL ACK/NACK information in LTE and LTE-A systems.

26. The device according to claim 19, wherein the feedback module is configured to feed back the UL ACK/NACK information, which corresponds to the last transmission before the switching of the one or more DL HARQ transmissions and is not fed back on the UL subframe before the switching, and UL ACK/NACK information which corresponds to the one or more DL HARQ transmissions after the switching, on the same UL subframe which is after the switching.

27. The device according to claim 26, wherein a feedback mode of the UL ACK/NACK information is the same as a feedback mode of the UL ACK/NACK information in LTE and LTE-A systems.

28. The device according to claim 19, wherein during the feedback, the feedback module is set to feed back the UL ACK/NACK information, which corresponds to the last transmissions of different HARQ transmissions before the switching on different UL subframes which are after the switching.

29. The device according to claim 28, wherein a feedback mode of the UL ACK/NACK information is the same as a feedback mode of the UL ACK/NACK information in LTE and LTE-A systems.

30. The device according to claim 19, wherein a feedback mode of the UL ACK/NACK information is the same as a feedback mode of the UL ACK/NACK information in LTE and LTE-A systems.

\* \* \* \* \*